(12) United States Patent
Munk et al.

(10) Patent No.: US 11,080,235 B2
(45) Date of Patent: Aug. 3, 2021

(54) INCORPORATION OF DYNAMIC SEARCH RESULTS FROM A REMOTE SOURCE INTO A LOCAL FILE SYSTEM FOR LOG FILE ANALYSIS

(71) Applicant: Dashbase LLC, San Jose, CA (US)

(72) Inventors: Alexander Munk, San Mateo, CA (US); John Wang, San Jose, CA (US); Kevin Hou, Newark, CA (US); Min Zeng, Pleasanton, CA (US); Alejandro Crosa, Sunnyvale, CA (US); Keita Fujii, Sunnyvale, CA (US); Penghan Wang, Hangzhou (CN); Chao Weng, Hangzhou Province (CN)

(73) Assignee: Dashbase LLC, San Jose, CA (US)

( * ) Notice: Subject to any disclaimer, the term of this patent is extended or adjusted under 35 U.S.C. 154(b) by 88 days.

(21) Appl. No.: 16/263,910

(22) Filed: Jan. 31, 2019

(65) Prior Publication Data

US 2020/0250140 A1    Aug. 6, 2020

(51) Int. Cl.
*G06F 16/00*  (2019.01)
*G06F 16/14*  (2019.01)
*G06F 16/188* (2019.01)
*G06F 16/17*  (2019.01)

(52) U.S. Cl.
CPC ......... *G06F 16/148* (2019.01); *G06F 16/156* (2019.01); *G06F 16/1734* (2019.01); *G06F 16/188* (2019.01)

(58) Field of Classification Search
CPC .. G06F 16/148; G06F 16/156; G06F 16/1734; G06F 16/188
See application file for complete search history.

(56) References Cited

U.S. PATENT DOCUMENTS

| | | | |
|---|---|---|---|
| 8,225,057 B1* | 7/2012 | Zheng | G06F 11/1458 711/162 |
| 10,095,710 B1* | 10/2018 | Whitmer | H04L 67/1097 |
| 2011/0153697 A1* | 6/2011 | Nickolov | H04L 67/10 707/827 |
| 2012/0173655 A1* | 7/2012 | McEntee | G06F 16/1834 |
| 2014/0344267 A1* | 11/2014 | LeBert | G06F 16/972 707/736 |
| 2015/0058384 A1* | 2/2015 | Karamanolis | G06F 16/188 707/827 |
| 2016/0205172 A1* | 7/2016 | Chadha | G06F 9/45558 709/217 |
| 2017/0318119 A1* | 11/2017 | Zbiljic | G06F 12/0862 |

* cited by examiner

*Primary Examiner* — Diedra McQuitery
(74) *Attorney, Agent, or Firm* — Behmke Innovation Group LLC; James M. Behmke; Jonathon P. Western

(57) ABSTRACT

A system enables tool to process remote log files as if the log files were located locally. The system relies on technology, such a file system in user space (FUSE), to add log file search results to the local file system. In some embodiments, the log file search results are associated with virtual files in the local file system. A remote data store system communicates with the local system to provide the search results in response to a search query.

9 Claims, 9 Drawing Sheets

| Service | Level | Host |
|---------|-------|------|
| kafka | INFO | kafka1.internal:9092 |
| kafka | WARN | kafka2.internal:9092 |
| auth | INFO | auth.dashbase.internal:9678 |
| indexer | INFO | indexer.dashbase.internal:7888 |

FIG. 6

INCORPORATION OF DYNAMIC SEARCH RESULTS FROM A REMOTE SOURCE INTO A LOCAL FILE SYSTEM FOR LOG FILE ANALYSIS

BACKGROUND

A log file is a file that stores information regarding events or messages that occur in a computer system or a computer network. Network administrators find it helpful to have access to such log files and to perform analysis on the contents of such log files. Traditionally, log files have been stored locally on a local machine or network where the contents of the log files may be easily accessed.

A number of software tools traditionally have been used to review and analyze the contents of the log files. For example, in Unix® environments, a number of tools have been available for use in reviewing and analyzing log files. Once such tool is the cat utility. This program name is short for concatenate. The cat utility reads files sequentially and writes them to a standard output in the same sequence. Standard output is the stream where a program writes its output data.

Another tool that has commonly been used to process log files is the less utility. The less utility is a terminal pager that enables the display of information one page at a time. This avoids all of data being viewed in one continuous scrolling sequence.

One of the tools is the grep utility, which performs a global search of a regular expression and prints the matching lines. The grep utility locates instances of a regular expression globally and then prints the lines with the regular expression that are located in the file. The grep utility is useful for locating a string of words, for example.

An additional tool that is used with log files is the tail utility. The tail utility displays the tail end of a text file or a pipe data. It outputs the last ten lines of standard output by default.

SUMMARY

In accordance with an exemplary embodiment a method is practiced in a computer system. The method includes requesting that a file system be mounted on the computer system, wherein the file system includes file system constructs. A request to access a selected at least one of the file system constructs by an application running on the computer system is received. In response to the request, a search request is sent to a remote data store. The remote data store stores files that are not part of the file system. Results of the search are received and access is provided to the received results of the search to the application as if they were stored in the selected one or more file system constructs.

The remote data store may store log files. The computer system may run an operating system and the request to access the selected at least one of the file system constructs may be a system call to the operating system. The request may be received by hooking the system call to the operating system from the application in some instances. The search request may comprise sending a request to the remote data store to provide contents for the selected at least one construct. The selected one or more file system constructs may comprise one or more files or one or more folders. File System in User Space (FUSE) may be used to receive the request and send the search request. The application may take many forms including one of the less utility, the tail utility, the grep utility or the cat utility.

In accordance with an exemplary embodiment, a method is practiced in a computing system having a file in a file system. A request to access contents of the file is received. Contents of the file are dynamically obtained from a remote data store in response to the request. In further response to the request, access is provided to the dynamically obtained contents as if the contents were stored in the file.

The method may also include receiving a second request to access the file and dynamically obtaining new contents for the file from the remote data store in response to the second request. In further response to the second request, access to the new contents may be provided as if the results were new contents stored in the file.

In some instances, the dynamically obtained contents may be cached for subsequent requests to access the files. The remote data store may store log files. The computer system may run an operating system, and the request to access may be a system call to the operating system. The method may include the additional steps of hooking a system call and generating a search request to the remote data store to obtain the contents.

These methods may be performed by instructions stored on a non-transitory computer readable storage medium that are executable by a processor of a computing device.

BRIEF DESCRIPTION OF THE DRAWINGS

FIG. 6 shows an example of a portion of the table in a remote database holding log file information.

DETAILED DESCRIPTION

The review and analysis of log files has changed due to the volume of log file information and location of log files within organizations. More recently, log files have been accessed by way of web interfaces, where the log files are stored remotely relative to the client that is requesting access to the log files. Moreover, the log files may be stored on different devices and at disparate locations.

One difficulty encountered when the log files are accessed by way of web interface is that network administrators may no longer use the tools, such as the less, cat, grep and tail utilities, that traditionally have been used locally on the terminal to access and process log files. This poses a hardship to such network administrators. The exemplary embodiments described herein provide a mechanism for such tools to be used on log file data that is located remotely. Exemplary embodiments are able to mount a sub-tree containing desired log file information on a local file system. The illustrative embodiments may use the mount command available in the Unix operating system, for example, to achieve this objective. A mounted sub-tree may hold dynamic search results obtained from a remote database of log file information. Virtual files may be associated with the dynamic search results, and such virtual files may be accessed by applications, such as the tools mentioned above, to gain access to the desired log file information as if the search results were stored in the associated virtual files. The exemplary embodiments may exploit the FUSE technology to access the mounted log file information in the local file system.

The exemplary embodiments allow the network administrator to act as if the files are located locally and accessible on the local system. These files actually are remotely located and are virtual files representing dynamic search results. A FUSE handler is provided that is responsible for receiving requests to access the virtual files, sending search requests to the remote data store for the log files and returning the results via the operating system kernel to the requesting application. Thus, the exemplary embodiments map a file system call to a search query and return the results of the search query so that the results may be accessed as if they are part of a file.

As will be explained in more detail below, the mounted sub-tree is a representation of how a party wants to see the log file data. The directory may be set up in whatever fashion the party desires to hold the appropriate dynamic search results.

Figure 1:
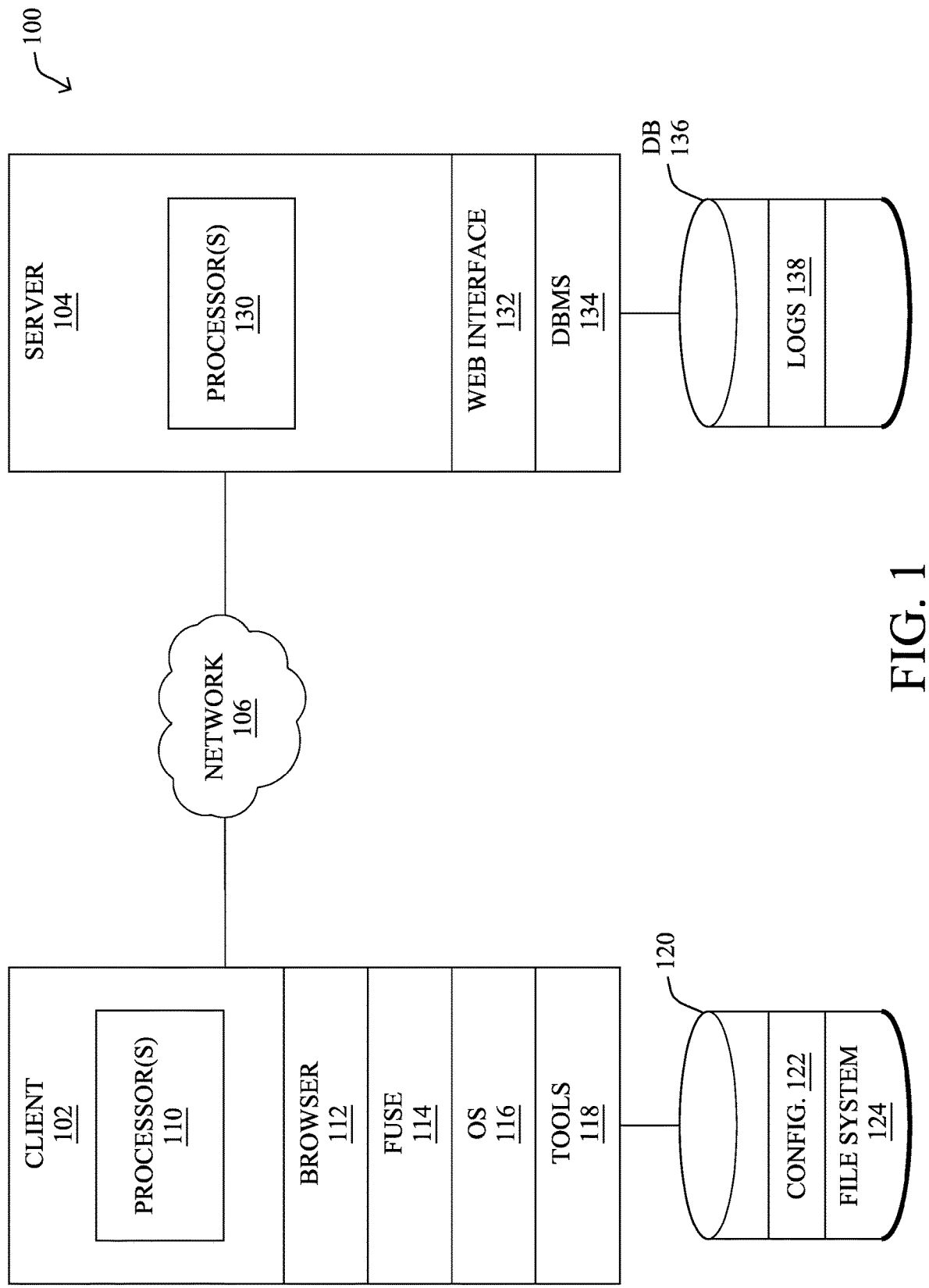
FIG. 1 depicts a distributed environment that is suitable for practicing exemplary embodiments of the present invention.

FIG. 1 shows a distributed environment 100 that is suitable for practicing exemplary embodiments. The distributed environment 100 includes a client computing device 102 that interacts with a server computing device 104. The client computing device 102 and server computing device 104 communicate over a computing network 106. The computing network 106 may take the form of a wide area network, such as the Internet, or may take the form of another variety of network. The client computing device 102 may include one or more processors 110 for executing instructions to perform desired functionality. The client computing device 102 may execute a browser 112 that enables access to websites and that can render HTML content, XML content and the like. The client computing device 102 also contains FUSE components 114 as will be described in more detail below. The client computing device 102 may execute an operating system (OS) 116. The operating system may take many different forms including but not limited to the Unix operating system or the Linux operating system. The client computing system 102 may also include a number of tools 118 that may take the form of programs or functionality that assists a network administrator or other user in processing log file information. The tools may include tools such as the cat, less, grep and tail tools discussed above. Other varieties of tools may also be provided for assisting in the viewing and analysis of log file information.

The client computing device 102 may have access to one or more storage devices 120. The storage devices may hold information regarding a file system 124 and may hold one or more configuration files 122 that may be used to configure and mount appropriate subdirectories into the file system provided by the operating system 116.

Those skilled in the art will appreciate that the client computing device 102 may take many different forms, including but not limited to that of a workstation, a desktop computer, a laptop computer or other computing device, such as a tablet computing system, a smartphone or the like. The client computing device 102 may execute computer readable instructions stored on a non-transitory storage medium. These instructions may perform the operation described herein.

Instructions may be stored on magnetic disc, optical disc, solid state storage, or other storage devices. The computing device 102 may include storage, such as random access memory (RAM), read only memory (ROM) and variants thereof.

The server computing device 104 may include one or more processes 130 for executing instructions. The server 104 may execute instructions for providing a web interface 32 to enable clients to access a database 136. A data store system 134 may be provided and may manage the database 136. The database 136 may include log files 138 for an enterprise, an organization, a computing network or the like. The log files 138 need not be stored in a single physical device but rather may be stored across multiple devices. The storage may be realized in a number of different forms, such as on magnetic state storage, magnetic tape storage, optical state storage, solid state storage or the like. For purposes for exemplary embodiments, it is assumed that the server 106 provides access to the log files in response to request from clients.

Those skilled in the art will appreciate the depiction of the distributed environment 100 in FIG. 1 is intended to be merely illustrative and not limiting. Moreover, there may be multiple clients computing devices and multiple server computing devices. The depiction of a single client device and a single server device 104 is shown for purposes of clarity. Still further, the client computing device and server computing device may have access to multiple storage devices rather than one.

As is mentioned above, the exemplary embodiments mount a sub-tree into a local file system. The sub-tree may hold directory entries and files for search results obtained from searches conducted by the data store system 134 of the server computing device 104. This enables a network administrator or user to locally access the log file search results locally as if the log file search results were stored locally in files of the local file system.

Figure 2:
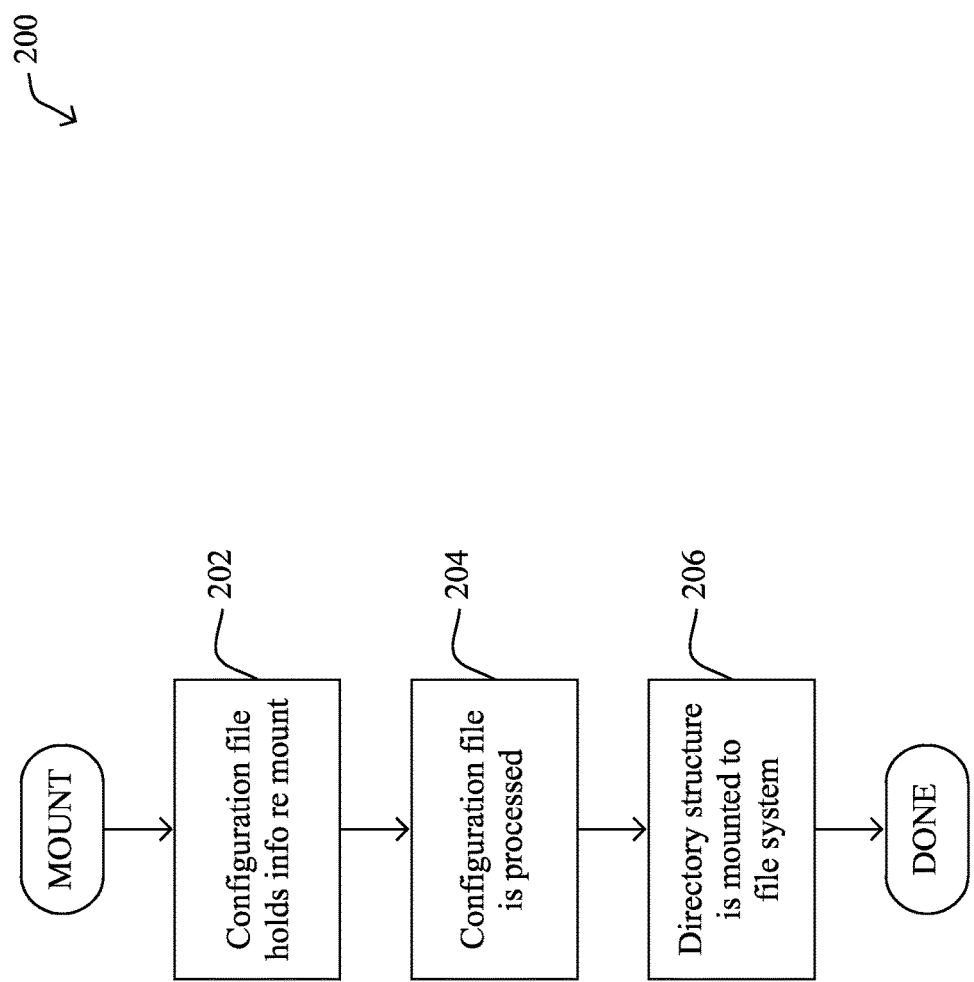
FIG. 2 is a flowchart illustrating steps that are performed to mount log files search results onto a local file system.

FIG. 2 shows a flowchart 200 illustrating steps that are performed to enable the search results to be stored in a sub-tree that is viewed as part of a local file system. Initially, a configuration file is provided that holds information regarding the sub-tree that is to be mounted in the local file system (step 202). As will be described in more detail below, the configuration file may hold information regarding the structure of the sub-tree and may identify what portions of the log files are of interest. (Step 202). Thus, the sub-tree is a representation of how the user wishes to see the data. The files and directories in the sub-tree are representations of the search results.

When a party wishes to mount the sub-tree, the configuration file is processed in step 204. The processing of the configuration file identifies what portion of the log files are of interest and specifies directory tree structure for the sub-tree that is to be mounted into local file system. A "mount" command or equivalent command may be executed so that the directory structure is mounted to the local file system in step 206.

Figure 3:
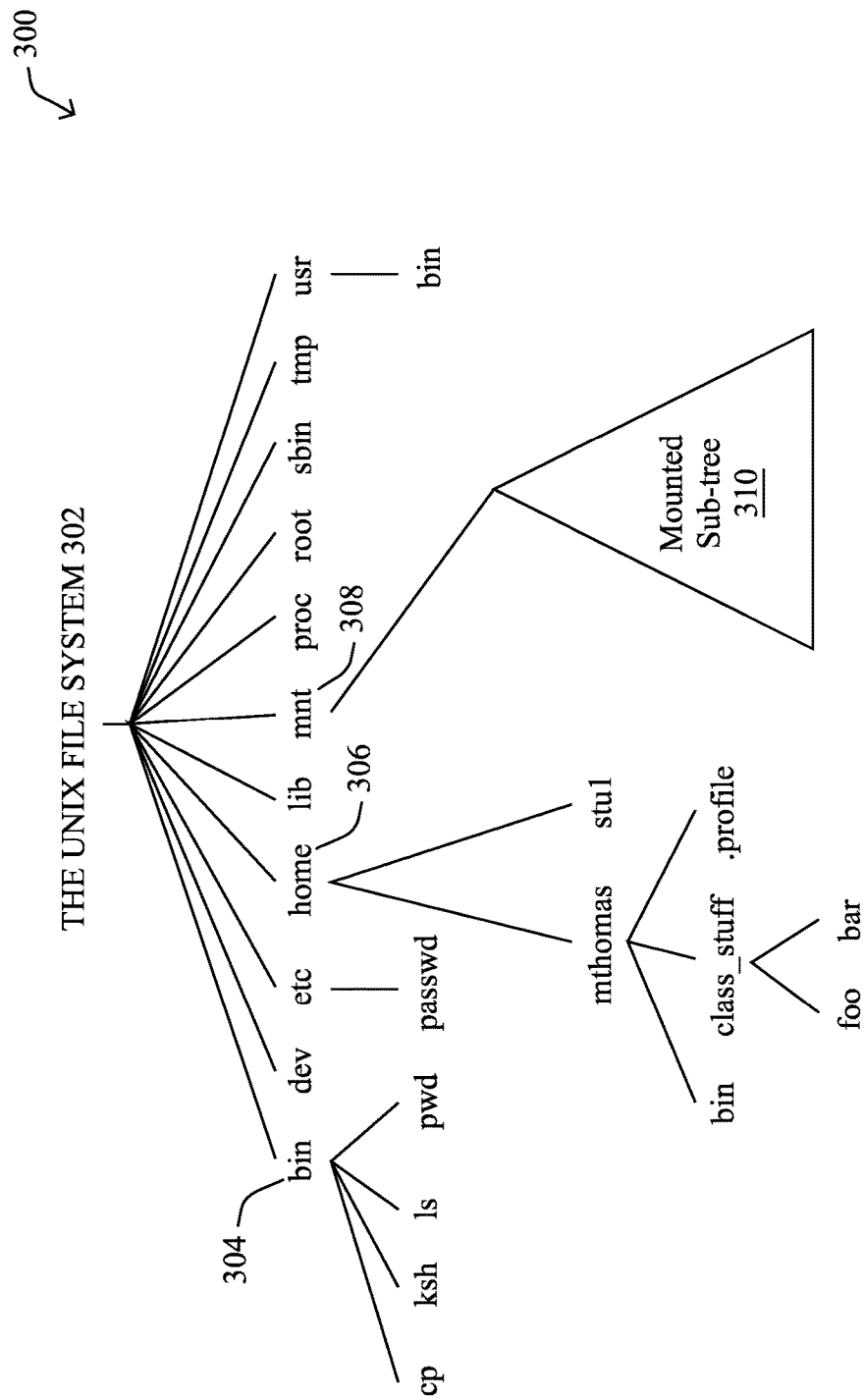
FIG. 3 illustrates an example of a file system structure, including a mounted sub-tree.

FIG. 3 shows an example of the structure of an exemplary Unix file system 300. The structure is organized as a tree. The file system is organized as a hierarchical arrangement of directories and files. The root directory 302 is the Unix file system root. Branching off the root directory 302 are a number of directories having associated directory entries. Each directory entry holds attributes regarding a file. For example the bin directory 304 holds binaries and is where many commonly used executable commands reside. The home directory 306 contains user directories and files. The mnt directory 308 contains files related to mounted file systems and/or devices. Mounted subtree 310 is shown as being mounted under the mnt directory in the example in FIG. 3.

Once the sub-tree is mounted, the dynamic search results may be associated with virtual files that are visible in the sub-tree of the local file system and thus may be accessed as if the data was locally held.

Figure 4:
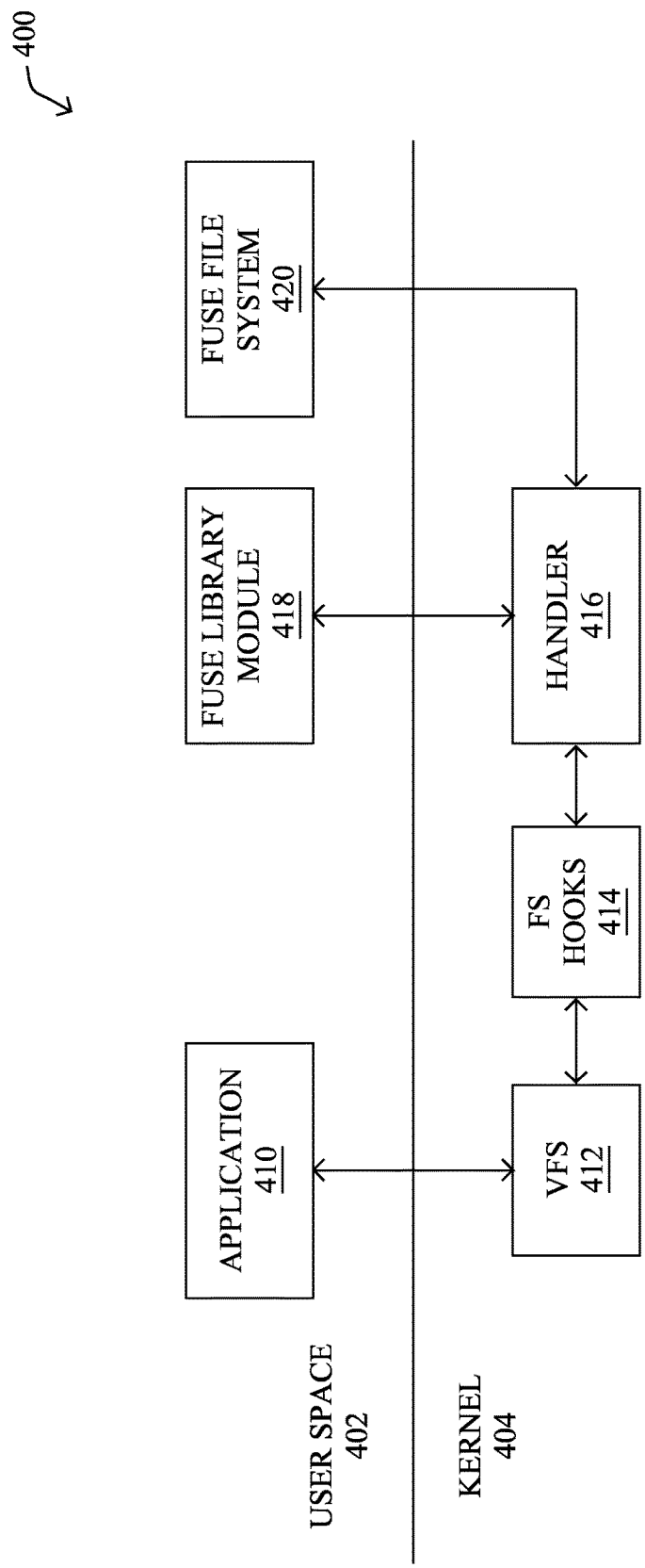
FIG. 4 depicts the interaction of software components in the kernel space and the user space when a request is made to access a virtual file associated with dynamic search results that has been mounted onto the file system.

FIG. 4 shows the basic arrangement of the software components that facilitate such an interaction as shown in the configuration 400 of FIG. 4. The software is either in the user space 402 that is accessible to a user and the kernel space 404 for the kernel of the operating system. In example shown in FIG. 4, an application 410, such as one of the tools described above, seeks to access a file. The file is one of the virtual files associated with a particular variety of the log file information. The file system 412 receives a system call to access the virtual file. Hooks 414 are provided into the file system when a party desires to access one of the virtual files. The system call is then handled by a FUSE handler 416. The FUSE handler passes the request onto a FUSE library module 418 that acts as a Daemon for accessing the FUSE file system 420 to gain access to the desired content. In particular, the handler 416 may pass a search request onto the remote data store system to obtain the dynamic search results that are then returned by the handler back through the file system to the application.

Each time a virtual file is read or opened the results associated with the file may be different. The results may be for a unique search each time. Alternatively, the content of the virtual file (i.e. the search results for a particular search) may be cached and preserved for multiple accesses. This may be a configurable option.

Figure 5:
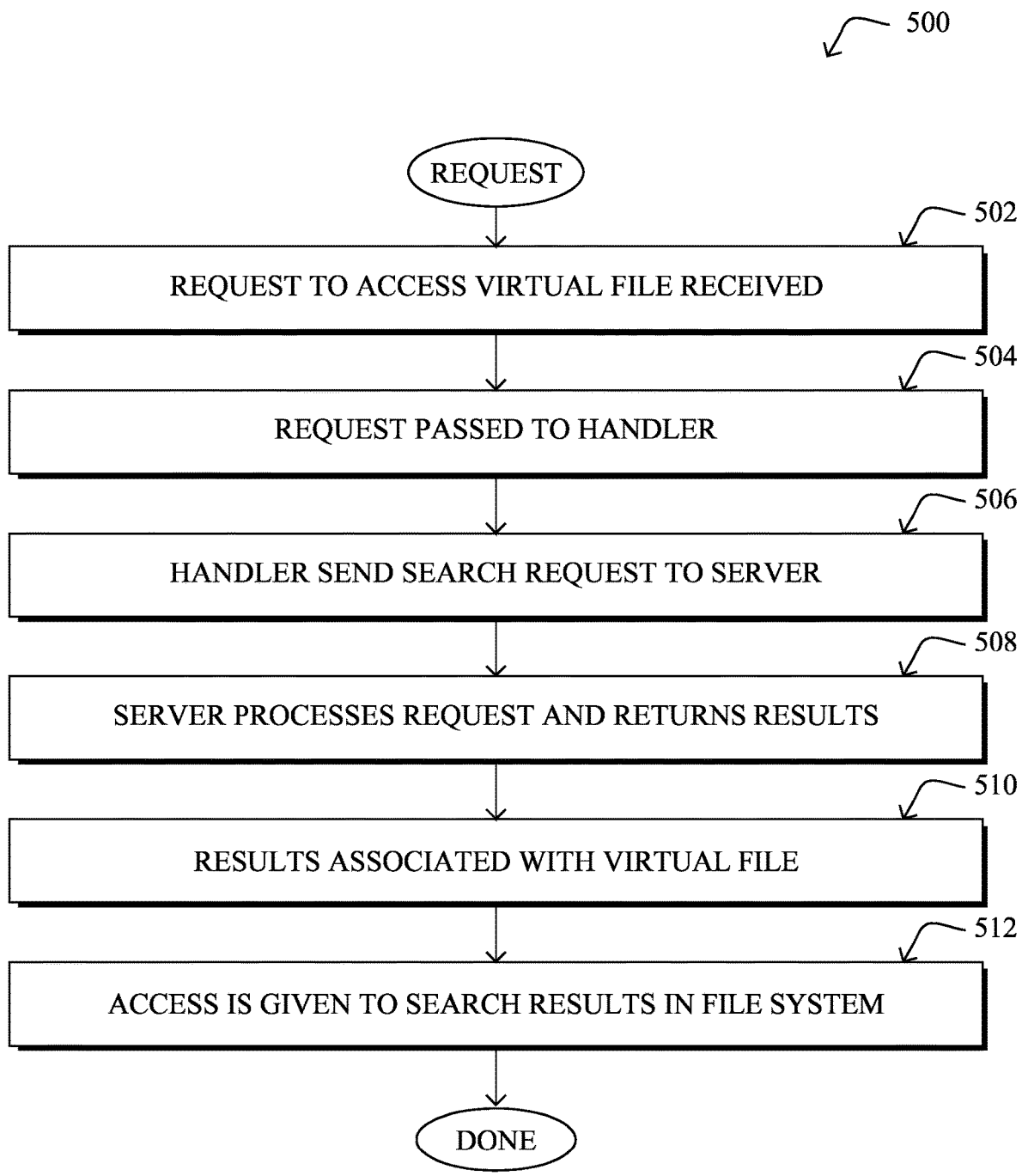
FIG. 5 is a flowchart illustrating the steps that are performed when a request is made to access the contents of a virtual file.

FIG. 5 provides a flowchart 500 that shows the steps that are performed for such a request to access contents of a virtual file that holds log file information. The virtual file is in the sub-tree that has been mounted to the local file system. Initially, a request to access the virtual file is received by the file system 412 from the application 410 (step 502). The request is then passed from the file system 412 to the handler 416 via the file system hooks 414 (step 504). The handler 416 then sends the search request to the server (step 506). The server processes the request and returns the search results (step 508). The results are associated with the virtual file (step 510) and access is given to the search results in the file system as was discussed above (step 512).

Figure 7A:
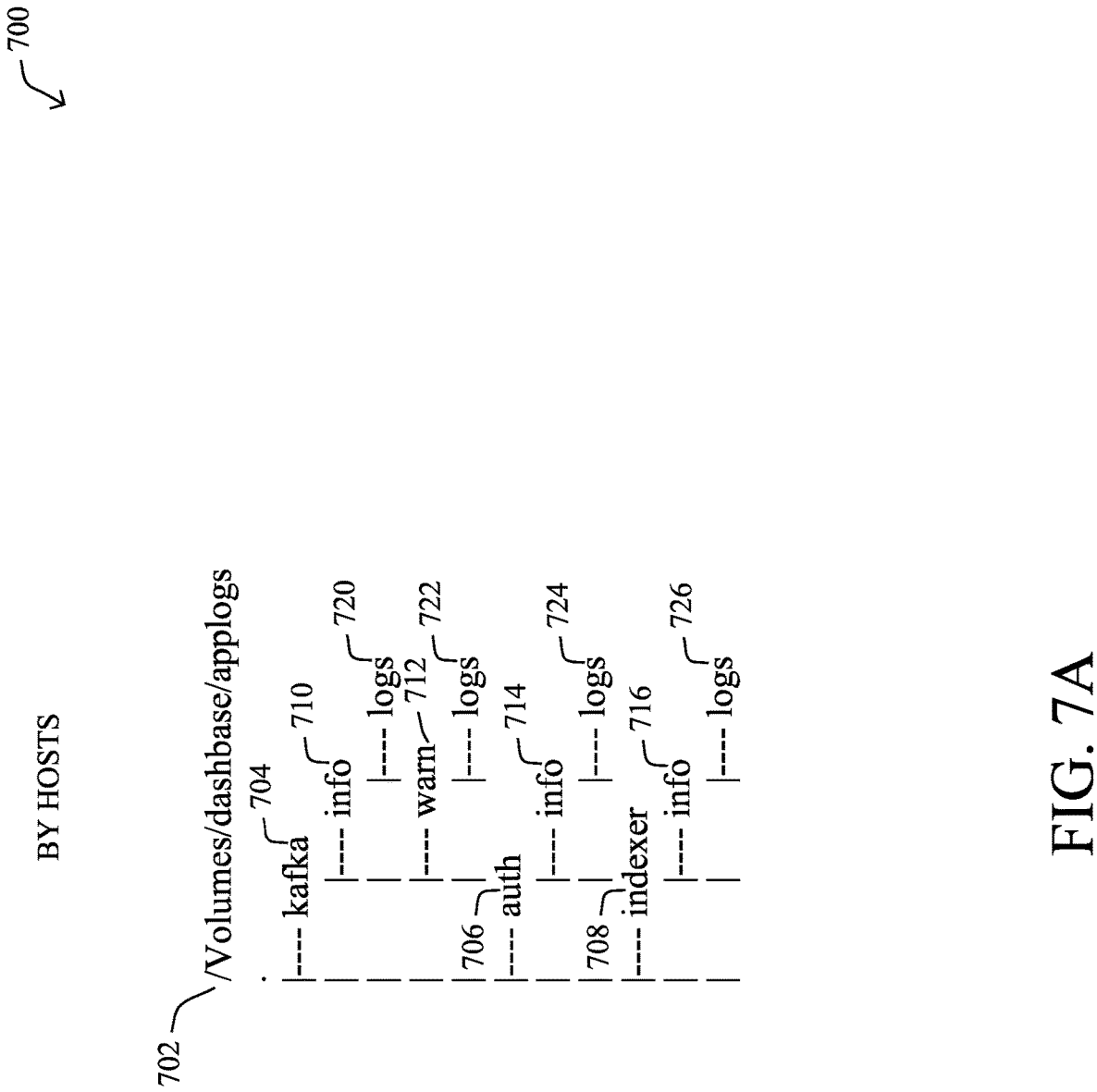
FIG. 7A is an example of a subtree of a portion of a file system that is configured to be sorted by host.

FIG. 6 shows an example of a data set 600 from log files organized as a table with column 602 identifying a service, column 604 identifying a level and column 606 identifying the host. Each row refers to log information for a particular combination of service level and host. Thus, rows 612, 614 and 616 are provided. A configuration file may choose to organize a subdirectory by service followed by host. In that instance, the data set will be organized in the subdirectory as shown in FIG. 7A. The subdirectory 700 has a root node 702 followed by directory entries for this service. The first directory entry 704 is for the kafka service which has entries in rows 610 and 612 of the data set 600. A subdirectory for the info level 710 and a subdirectory for the warn level 712 are provided. The associated logs 720 and 722 are provided under those subdirectories. Similarly, there is a directory 706 for the auth service and a subdirectory 708 for the index service. The subdirectory info 714 is provided to hold the log 724 and the subdirectory 716 for a level info holds the log 726.

Figure 7B:
FIG. 7B depicts a portion where a subtree for a portion of a file system when the table of FIG. 6 contents are sorted by levels.

FIG. 7B shows an example wherein the directory structure is organized by levels rather than simply by hosts. The resulting subdirectory 750 has a root node 752 with directories for the Kafka service 754, the auth service 756 and the indexer service 758. The subdirectories are for the respective levels 760 and 762 of the kafka service, each of which holds log files, 770 and 772, respectively. Similarly, the auth service has a subdirectory 764 that holds log 774 and the indexer service has a directory 758 that holds a subdirectory 766 that contains the log file 776.

Figure 8:
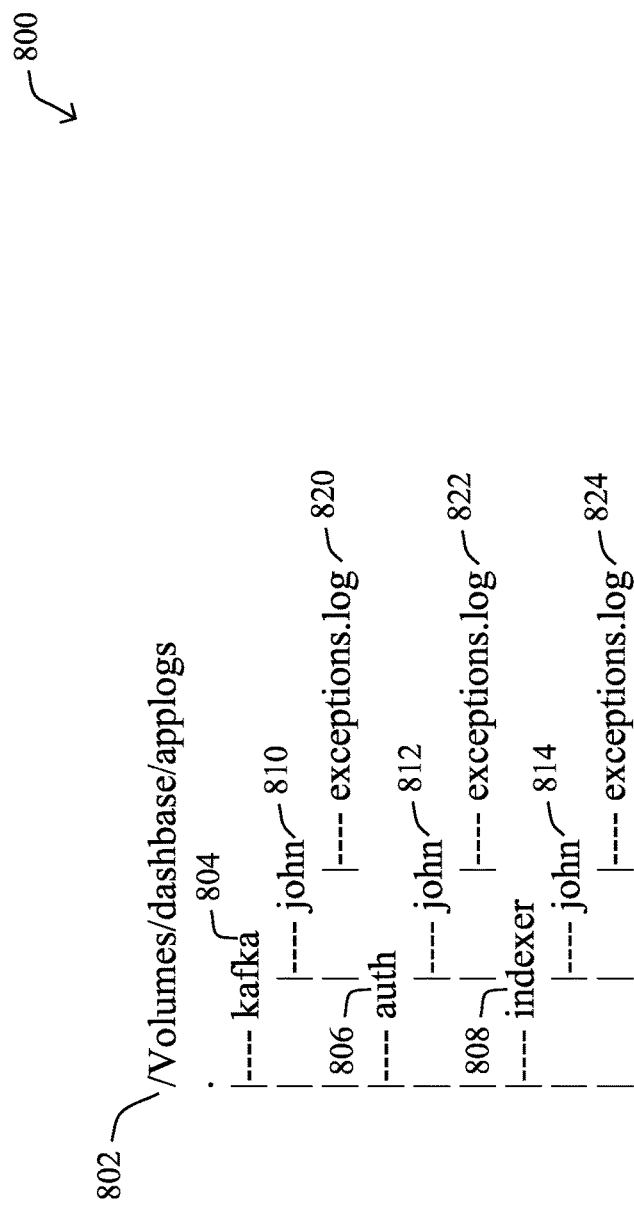
FIG. 8 shows another example of an alternative configuration of a subdirectory for contents of the table of FIG. 6.

The configuration file may also account for server side filters. The syntax of the file may account for such filters. FIG. 8 shows an example of a directory structure 800 for a configuration file wherein only files identified as exception-.log are included. This filtering is done on the server side when the search results are returned. The directory structure 800 has a root node 802 and directories 804, 806 and 808. The directory structure 800 also is configured to filter for a particular name. In this case the name is "john." Directory entries 810, 812 and 814 in which respective exception log files 820, 822 and 824 are stored.

These examples illustrate the configurability and filtering is available in the exemplary embodiments.

While the present invention has been described with reference to exemplary embodiments herein, those skilled in the art will appreciate the various changes in form and detail may be made without departing from the intended scope of the present invention as defined in the appended claims.

What is claimed as new and desired to be protected by Letters Patent of the United States is:

1. A method practiced in a computer system, comprising:
    requesting that a sub-tree be mounted on a local computer system, wherein the sub-tree includes a plurality of virtual files, each of which configured to store log file information;
    receiving a request to access remotely stored log file information by an application running on the local computer system;
    in response to the request, sending a search request for the remotely stored log file information to a remote data store, wherein the remote data store stores a plurality of log files;
    receiving search results corresponding to the remotely stored log file information, wherein the search results are associated with one or more of the plurality of virtual files; and
    providing the application access to the remotely stored log file information via the one or more virtual files as if the remotely stored log file information was stored locally in the local computer system.

2. The method of claim 1 wherein the local computer system runs an operating system and the request to access the remotely stored log file information is a system call to the operating system.

3. The method of claim 2, wherein the receiving the request comprises hooking the system call to the operating system from the application.

4. The method of claim 3, wherein sending the search request comprises sending a request to the remote data store to provide contents for the remotely stored log file information.

5. The method of claim 1, wherein file system in user space (FUSE) is used to receive the request and send the search request.

6. The method of claim 1 wherein the application is one of a less utility, a tail utility, a grep utility, or a cat utility.

7. A non-transitory computer-readable storage medium storing instructions executable by a processor of a computing device, causing the processor to perform the following:

requesting that a sub-tree be mounted on a local computer system, wherein the sub-tree includes a plurality of virtual files, each of which configured to store log file information file system;

receiving a request to access remotely stored log file information by an application running on the local computer system;

in response to the request, sending a search request for the remotely stored log file information to a remote data store, wherein the remote data store stores a plurality of log files;

receiving search results corresponding to the remotely stored log file information, wherein the search results are associated with one or more of the plurality of virtual files; and providing the application access to the remotely stored log file information via the one or more virtual files as if the remotely stored log file information was stored locally in the local computer system.

8. The non-transitory computer-readable storage medium of claim 7 wherein the local computer system runs an operating system and the request to access the remotely stored log file information is a system call to the operating system.

9. The non-transitory computer-readable storage medium of claim 8 wherein the receiving the request comprises hooking the system call to the operating system from the application.

* * * * *